US006628651B1

United States Patent
Ryan et al.

(10) Patent No.: US 6,628,651 B1
(45) Date of Patent: *Sep. 30, 2003

(54) COMMUNICATION SWITCHING TECHNIQUES WITH IMPROVED FRAME FORMAT

(75) Inventors: Thomas E. Ryan, Batavia, IL (US); Terrence J. Tanis, Alsip, IL (US); Robert C. Klein, Lisle, IL (US); Daniel J. Marchok, Buchanan, MI (US); Gary L. Davis, Naperville, IL (US)

(73) Assignee: Tellabs Operations, Inc., Naperville, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/541,807

(22) Filed: Apr. 3, 2000

(51) Int. Cl.⁷ .................. H04L 12/64; H04L 12/00
(52) U.S. Cl. ............... 370/369; 370/300; 370/361; 370/386; 370/466; 370/470; 370/498; 370/535
(58) Field of Search .................. 370/299, 300, 370/360, 369, 386, 466, 470, 498, 535

(56) References Cited

U.S. PATENT DOCUMENTS

| 4,967,405 A | * | 10/1990 | Upp et al. ............ 370/1 |
|---|---|---|---|
| 5,040,170 A | * | 8/1991 | Upp et al. ............ 359/135 |
| 5,144,297 A | | 9/1992 | Ohara |
| 5,315,594 A | * | 5/1994 | Noser ............ 370/110.1 |
| 5,428,612 A | * | 6/1995 | Scheffel et al. ............ 370/84 |
| 5,537,447 A | * | 7/1996 | Urbansky ............ 375/372 |
| 5,550,876 A | * | 8/1996 | Urbansky ............ 375/371 |
| 5,555,262 A | * | 9/1996 | Urbansky ............ 370/102 |
| 5,579,310 A | | 11/1996 | Heiles |
| 5,666,351 A | * | 9/1997 | Oksanen et al. ............ 370/474 |
| 5,724,342 A | * | 3/1998 | Sihvola et al. ............ 370/242 |
| 6,049,550 A | * | 4/2000 | Baydar et al. ............ 370/466 |
| 6,094,737 A | * | 7/2000 | Fukasawa ............ 714/738 |

* cited by examiner

Primary Examiner—Hassan Kizou
Assistant Examiner—Joe Logsdon
(74) Attorney, Agent, or Firm—McAndrews, Held & Malloy, Ltd.

(57) ABSTRACT

Input interfaces convert a predetermined data frame structure, such as a Sonet STS-1, into an internal format comprising a predetermined number of rows and columns, the rows being a multiple of a number evenly divisible into the bytes contained in the internal frame format. A time-space switch switches the frame format while storing a row of bytes in a data memory. Output interfaces convert the switched data to the same type of data frame format received at the input.

34 Claims, 13 Drawing Sheets

Fig. 10A

Group Breakdown

Fig. 12

COMMUNICATION SWITCHING TECHNIQUES WITH IMPROVED FRAME FORMAT

BACKGROUND OF THE INVENTION

This invention relates to communication data switching and more particularly relates to such switching employing data organized in frames.

In the field of telecommunications, there are a number of standard frame formats which are built from successive combinations of fundamental 64 KBit/sec. channels. Each channel is represented as 8 bits transmitted every 125 microseconds (uS) (also referred to as a DS0 channel or an E0 channel). One such format is SONET (Synchronous Optical Network) which creates 125 uS frames containing Virtual Tributaries (VTs). The size of the VTs depends on the underlying payload being transported within a SONET frame. VT sizes include VT1.5, VT2, VT3 and VT6.

Of particular interest are the VT1.5 and VT2. The VT1.5 contains a total of 27 bytes of 8 bits per 125 uS frame and was sized to accommodate a DS1 payload. A DS1 is a standard format comprised of 193 bits per 125 uS frame—192 bits representing twenty-four DS0s and 1 overhead bit. Twenty-eight VT1.5s can be placed within a SONET STS-1 Synchronous Payload Envelope (SPE), the payload part of a SONET STS-1 transport frame. The VT2 contains a total of 36 bytes of 8 bits per 125 uS frame and was sized to accommodate an E1 payload. An E1 has 256 bits per 125 uS frame—240 bits representing thirty E0s and 16 overhead bits. Twenty-one VT2s can fit in an SONET STS-1 SPE. The STS-1 SPE is segmented into 7 VT Groups. Each VT Group can contain 4 VT1.5s or 3 VT2s.

Manipulation of traffic contained within a SONET STS-n SPE requires the ability to interchange VTs from one SONET stream to another. Switch fabrics exist which are optimized based on the level of hierarchy they need to operate. To be a totally non-blocking VT-level switch, it must be true that any incoming VT position in a SONET frame can be mapped to any same-sized free VT position in an outgoing SONET frame. This requires both time and space manipulation by the switch fabric. Typical switch network architectures to perform these functions are known to be realized by cascading time and space switch elements. One known example of this type of architecture is the T-S-T architecture, where the signals pass through a total of three network stages, the first and last of which are time switched, and the middle of which is space switched. Furthermore, a different type of switch architecture using a three stage space switching network could be used to give a T-S-S-S-T type configuration.

Time switching involves re-ordering the time sequence (or VT position) of the VTs within a single SONET frame. This typically is realized by buffering the input stream such that as each output byte is required, a stable sample of the previous byte from any input timeslot (or VT position) is guaranteed to be available. In the case of a VT1.5 time switch for instance, 28 bytes of storage are required. For a VT2 time switch, 21 bytes of storage are required. A significant delay in the data path results from this input buffering with the delay being a function of the resolution required of the switch fabric (the lower the resolution, the longer the delay). Lower resolution also increases memory size and power dissipation.

Space switching is equivalent to a crossbar function where a given output's content can be based on one of several inputs. To achieve VT level switching, the selection of the input must be dynamic such that each VT timeslot in the SONET frame can have a unique mapping. Essentially no data delay is incurred in space switching. Resolution level in a space switching element does impact memory size and power dissipation, though not to the same degree experienced by the time switch stage.

For both time and space switching, the resolution of the fabric is typically consistent, and generally is set up to handle either VT1.5 or VT2 signals. However, the STS-1 frames could contain some VT Groups carrying VT1.5s and some containing VT2s. This presents a challenge, because systems optimized for manipulating VT1.5s cannot handle VT2s efficiently. Such a system would either need to have the VT2 distributed over 2 VT1.5s, which would then be mapped together through the fabric (resulting in a 33% loss of bandwidth efficiency), or it would be necessary to switch VT Groups with VT2s at the VT Group level (with a loss in routing flexibility, as all 3 VT2s would need to stay in that VT Group as it passes through the fabric). The reverse is also true. A system optimized for VT2 switching will not be able to accommodate VT1.5 manipulation without first mapping the VT1.5s into VT2s (resulting in a 25% bandwidth efficiency loss) or again resorting to switching the VT Group containing VT1.5s intact through the fabric.

A common method of handling "mixed traffic" composed of VT1.5s and VT2s is to employ a DS0/E0 level switch. The fabric can manipulate VT1.5s and VT2s without any lost bandwidth efficiency. The disadvantage lies in the large increase in data delay (~125 uS per time switch stage) and memory for storing connections and data. This is due to the need to store a full 125 uS frame of data in the time switch as opposed to only one byte per VT1.5 or VT2. These issues either eliminate this approach (data delay beyond network requirements) or reduce density (large memories restrict the capacity of individual switch elements).

Other fabrics have been proposed which operate on a 100 column basis, capable of manipulating VT traffic of any size by concatenating ~0.5 Mbps payload containers to form the various VT sizes. For example, see U.S. Pat. No. 5,579,310 (Heiles et al., issued Nov. 26, 1996). This frame structure, however, cannot directly support multi-rate timeslot interchange capability due to the fact that 100 is not evenly divisible by both 3 and 4 (i.e., has a least common multiple of 12). For this reason, all timeslot interchange stages in this approach have to buffer all 100 columns (timeslots), thereby causing a maximum throughput delay, regardless of whether only one type of VT traffic is being switched or not.

Another approach is described in U.S. Pat. No. 5,144,297 (Ohara, issued Sep. 1, 1992) which describes the processing of data in 36 byte increments (FIGS. 5–10). Such an approach is inefficient because four STS-1 frames need to be stored before all 36 bytes of the processing increment are available. Furthermore, since overhead is added to each of the 36 byte increments, the ratio of overhead to usable payload data is less efficient, and the processing required to manipulate the overhead is significantly more involved than structures proposed herein, where the overhead is shared among several VTs equivalents interleaved to form an STS-1 SPE equivalent structure.

A conventional STS-1 SPE (Synchronous Payload Envelope) is shown in FIG. 1 which demonstrates the SPE structure of an STS-1 signal as specified in GR-253-CORE. The SPE structure is composed of 87 columns of 8-bit bytes, of which one column carries the SPE Path Overhead, and two columns are Fixed Stuff columns. This leaves 84 columns remaining for Payload Area, which is sized to carry:

(a) 7 VT1.5 Groups (28 total VT1.5 signals per SPE), or (b) 7 VT2 Groups (21 total VT2 signals per SPE), or (c) 7 VT3 Groups (14 total VT3 signals per SPE), or (d) 7 VT6 Groups (7 total VT6 signals per SPE), or (e) 7 Mixed VT Groups (2 VT1.5, 2 VT2, 2 VT3, and 1 VT6 Group per SPE, for example), or (f) 1 DS3 signal per SPE.

The STS-1 SPE pointer is carried in the STS transport overhead, and thus is not included as part of the SPE data structure.

The order of transmission of the SPE signals is serial, starting at the top-left corner, proceeding in the direction of x (across the row), then down the column y to the next row, continuing until all bytes have been transmitted. The most significant bit (MSB) of the byte is the leftmost bit (first to be transmitted), whereas the least significant bit (LSB) is the rightmost bit (last to be transmitted).

Conventional VT Frames and Superframes are shown in FIG. 2 which demonstrates the VT Frame and Superframe structures for the various VT sizes as specified in GR-253-CORE. The VT Frame structure for a particular VT size is composed of a column of 8-bit bytes, where the first byte is specified as the VT Pointer Byte, and may contain V1, V2, V3, or V4, and the remaining bytes are the Payload Area, whose number of bytes is specified based on payload size:

(a) 26 payload bytes per VT frame for a VT1.5 signal.

(b) 35 payload bytes per VT frame for a VT2 signal.

(c) 53 payload bytes per VT frame for a VT3 signal.

(d) 107 payload bytes per VT frame for a VT6 signal.

The order of transmission of the VT signals is serial, starting at the top-left corner, proceeding in the direction of x (across the row), then down the column y to the next row, continuing until all bytes have been transmitted. The most significant bit (MSB) of the byte is the leftmost bit (first to be transmitted), whereas the least significant bit (LSB) is the rightmost bit (last to be transmitted).

Four consecutive VT Frames are needed to identify the VT Pointer Bytes V1, V2, V3 and V4 so as to form a complete VT pointer. Therefore, four consecutive VT Frames are assembled to form a VT Superframe. The four VT Frames contained within the Superframe are specified by the VT Pointer Bytes V1, V2, V3, and V4, and are organized such that the VT pointer Byte V1 is at the start of the Superframe, followed by the Payload Area for that VT frame, followed by the VT Pointer Byte V2, etc.

BRIEF SUMMARY OF THE INVENTION

The preferred embodiment of the invention is useful for switching communication signals that are received as predetermined data frame structures carrying a plurality of data collections comprising different numbers of collection bytes. In such an environment, the preferred embodiment converts the input data frame structure into a predetermined frame format comprising a number of frame format bytes arranged in a predetermined number of rows and a predetermined number of columns carrying at least the data collections. The number of rows is a multiple of a number evenly divisible into the different numbers of collection bytes. The data collections are switched while storing a predetermined number of bytes less than the number of frame format bytes at any one time in order to generate switched data. Switching is preferably accomplished with a time-space switch. The switched data is converted to the predetermined data frame structure, preferably by an output interface.

The foregoing switching techniques offer a number of advantages. For example, they can manipulate all VT traffic sizes specified by GR-253-CORE. The techniques provide high efficiency and bandwidth use, and time switch data delays of much less than 125 microseconds. In addition, by using the foregoing techniques, time switch network stages are optimized such that the throughput delay incurred in traversing these stages is reduced to a minimum based on the particular traffic passing through that stage. The techniques reduce the throughput delay for certain signal types in comparison to the time switch buffer delays incurred in conventional VT 1.5–VT 2 capable switches or DS0-E0 level solutions. As a result, the techniques enable improved mixed VT traffic switching.

BRIEF DESCRIPTION OF THE DRAWINGS

FIGS. 10A and 10B are graphs illustrating a frame format utilizing 32 columns and 27 rows that is useful with an embodiment of the invention.

FIG. 12 is a graph illustrating a frame format utilizing 32 columns and 27 rows that is useful with an embodiment of the invention.

DESCRIPTION OF THE PREFERRED EMBODIMENTS

Figure 3:
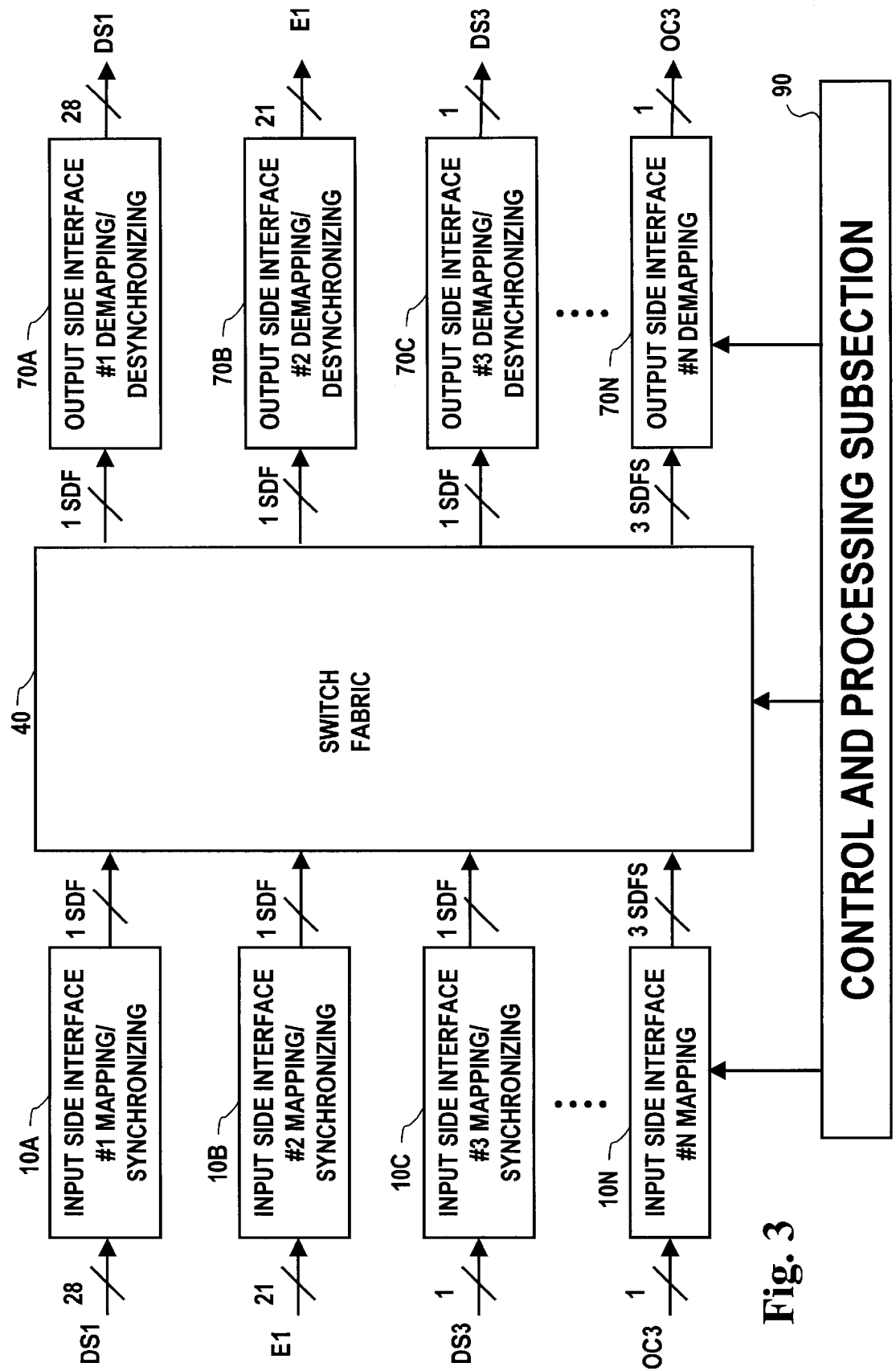
FIG. 3 is a schematic block and functional diagram illustrating a preferred form of the present invention.

A system diagram of a preferred embodiment of the invention is shown in FIG. 3. The preferred embodiment generally is composed of four primary elements:

(1) A plurality of input side interfaces 10A–10N interface the facility signals DS1, E1, DS3, STS-1E (not shown), OC-3, OC-12 (not shown) in the inbound direction. These interfaces also contain the means to synchronize asynchronous facility payloads (specified as per GR-253-CORE), and map the synchronous payloads into their Internal TVT or Modified STS-n SPE signals into the system data format, hereby known as SDF, which interfaces a switch fabric 40.

(2) A plurality of output side interfaces 70A–70N interface the facility signals DS1, E1, DS3, STS-1E (not shown), OC-3, OC-12 (not shown) in the outbound direction. These interfaces also contain the means to demap/demultiplex Internal TVT or Modified STS-n SPE signals from SDF signals from the switch fabric, demap the synchronous payloads from their internal TVT or modified STS-n SPE equivalent, and desynchronize synchronous payloads for transport on asynchronous facilities. Interfaces 70A–70N convert the data switched by switch fabric 40 into the frame formats originally received at the inputs to interfaces 10A–10N.

(3) Switch Fabric 40 is composed of both time and space switching elements, arranged in a particular configuration, so as to support completely non-blocking operation, whereby each input signal of a given size is guaranteed to be able to connect to any free output of the same size.

(4) A control and processing subsection 90 performs all control, processing and communication of instructions to the plurality of input side interfaces 10A–10N, plurality of output side interfaces 70A–70N and switch fabric 40. Subsection 90 also includes a user interface, whereby user commands are entered and processed.

Figure 4:
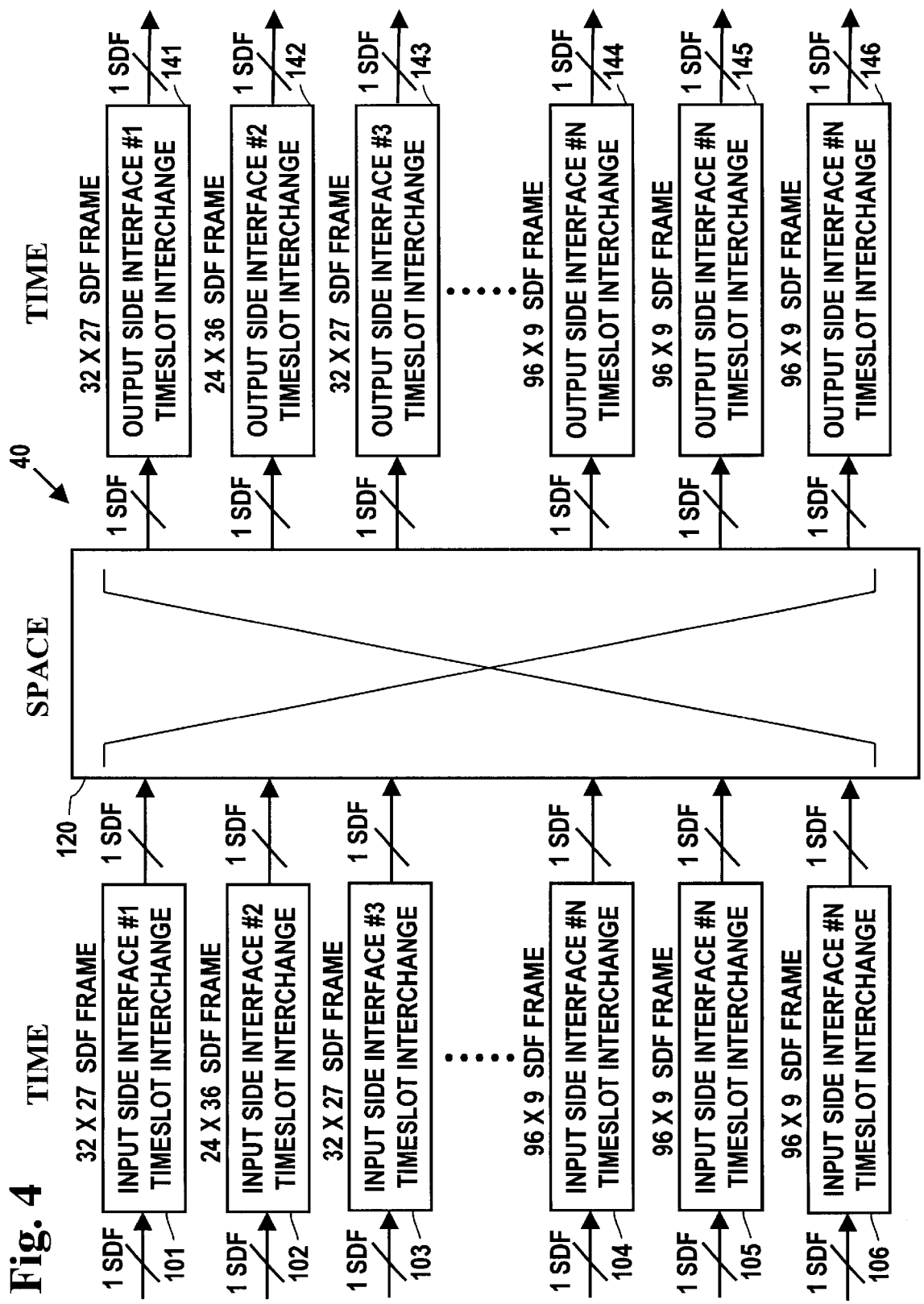
FIG. 4 is a schematic block and functional diagram illustrating the FIG. 3 switch fabric in more detail.

Switch fabric 40 is shown in more detail in FIG. 4. The switch fabric is composed of three primary elements;

(1) A plurality of input side timeslot interchanges 101–106 interface the SDFs from the input side interfaces 10A–10N. The input side timeslot interchanges reorder the time sequence for the columns of the SDF frames in a non-blocking fashion, such that each input column is guaranteed to be able to connect to any free output column. The input side timeslot interchanges are restricted to reordering the time sequence of the columns of the SDF frames over the number of columns specified by the particular SDF frame being used (i.e. the input side timeslot interchanges using the 32×27 SDF frame (i.e., 101 and 103) are restricted to reordering over 32 columns, whereas the input side timeslot interchanges using the 96×9 SDF frame (i.e., 104–106) are restricted to reordering over 96 columns). The input side timeslot interchanges' outputs interface to a space switch 120 via SDF.

(2) A plurality of output side timeslot interchanges 141–146 interface the SDFs to the output side interfaces 70A–70N. The output side timeslot interchanges' inputs interface to the space switch via SDF. The output side timeslot interchanges reorder the time sequence of the columns of the SDF frames in a non-blocking fashion, such that each input column is guaranteed to be able to connect to any free output column. The output side timeslot interchanges are restricted to reordering the time sequence of the columns of the SDF frames over the number of columns specified by the particular SDF frame being used (i.e., the output side timeslot interchanges using the 32×27 SDF frame (i.e., 141 and 143) are restricted to reordering over 32 columns, whereas the output side timeslot interchanges using the 96×9 SDF frame (i.e., 144–146) are restricted to reordering over 96 columns).

(3) Space switch 120 is composed of either a single space switch stage, or a cascaded three stage space switch in a CLOS network formation. Space switch 120 performs the crossbar function by moving each column of each input SDF to the corresponding column of one output SDF or a plurality of output SDFs in a non-blocking fashion, such that each input column on a given SDF is guaranteed to be able to connect to a corresponding free output column on any output SDF or a plurality of output SDFs.

Figure 5:
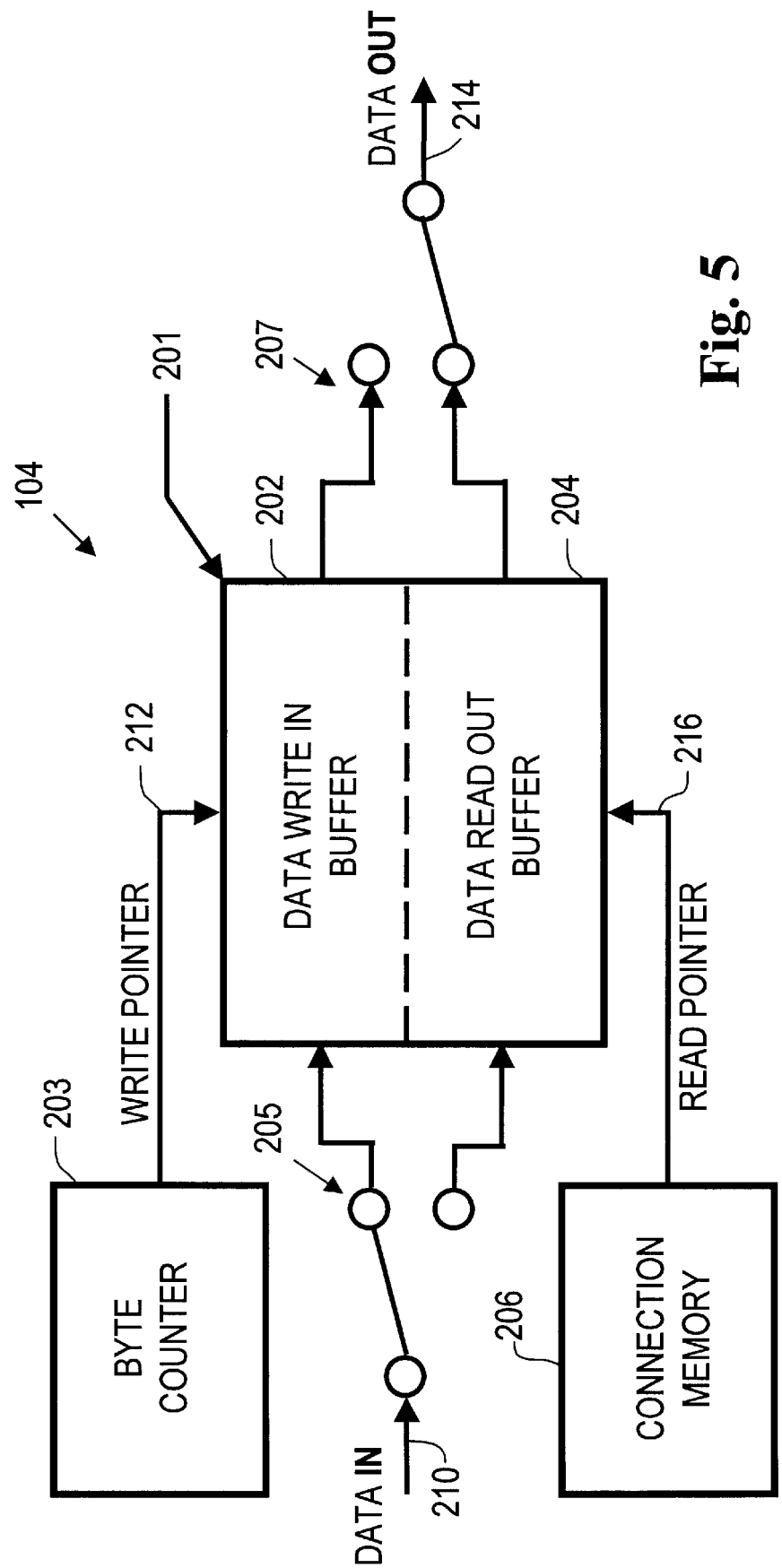
FIG. 5 is a block and functional diagram illustrating a preferred form of time slot interchange for use in connection with the apparatus shown in FIG. 4.

Exemplary timeslot interchange 104 is shown in FIG. 5. The other timeslot interchanges are like interchange 104. There are four primary elements involved in timeslot interchange function 104:

(1) A data write in buffer 202 forming half of a memory 201;

(2) A data read out buffer 204 forming another half of memory 201;

(3) A byte counter 203 and (4) A connection memory 206.

At any given time, one half of the data memory 201 is allocated to the data write in buffer 202 and the remaining half is allocated to the data read out buffer 204. The half of memory 201 initially allocated to the data writer in buffer functions as such for x bytes (until the write in buffer memory 201 is completely written). Once memory 201 has been completely written, the data write in buffer 202 becomes the data read out buffer 204 for x bytes, whereby the values stored in the memory 201 can be read out in some predetermined fashion. The function of directing input data to buffer 202 or buffer 204 is represented by a switch 205.

Similarly, the half of the memory initially allocated to the data read out buffer 204 functions as such for x bytes. After the x bytes of stored data have been read out, the data read out buffer becomes the data write in buffer for x bytes. The two halves of the data memory 201 therefore alternate function every x bytes, or one row of a data frame. The half allocated to the data write in buffer stores or accumulates new incoming data, while the half allocated to the data read out buffer reads out the data stored during the previous row's accumulation. The function of reading output data from buffer 202 or buffer 204 is represented by a switch 207. The order of stored bytes being read out of memory 201 is controlled by connection memory 206.

The part of data memory 201 acting as the data write in buffer has the data presented at a data in input 210 written into x successive bytes of memory. So, less than two rows of the data frame, and preferably only one row of the data frame is written into x successive bytes of memory as directed by the write pointer transmitted on bus 212 until all x bytes of the data write in buffer have been written. The write pointer starts at buffer byte 0, and is incremented once every byte time, until reaching its maximum count of buffer bytes (x−1).

At the same time, the part of the data memory 201 acting as the data read out buffer outputs x bytes of stored data in some predetermined sequence to data out output 214 as directed by a read pointer transmitted on a bus 216 which is controlled by connection memory 206. The connection memory directs which of the x buffered bytes will be output at any given data out byte time. Connection memory 206 stores x connection memory addresses, one address for each byte of one row of the data output frame. Each connection memory address stores the number of the data read out buffer byte to be sent at a given data out byte time. For example, if the connection memory address for byte (x−1) is equal to buffer byte 0, this indicates that the data stored in the data read out buffer byte 0 is sent during byte time (x−1) of data out.

Byte counter 203 is used as a circular counter, counting byte times from 0 to (x−1). Upon reaching (x−1), the byte counter returns to 0, and begins counting anew.

The delay encountered in traversing a timeslot interchange function is significant. In general, the timeslot interchange function introduces x bytes of delay, or one row of a data frame, to the alignment of the data frame. In other words, if the first bit of a new frame of data were to enter the timeslot interchange function at time y, the time that the first bit of the new frame of data leaves the timeslot interchange function would be given by:

$$\text{timeslot interchange exit time} = y + (x \text{ bytes} * \text{byte time})$$

Setting y=0 gives the timeslot interchange throughput delay:

timeslot interchange throughput delay=x bytes*byte time

The delay traversing a single timeslot interchange stage for the various proposed data frame structures is:

throughput delay$_{96\times 9}$=13.89 us (microseconds)

throughput delay$_{32\times 27}$=4.63 us throughput delay$_{24\times 36}$=3.47 us Many telecommunications products carrying voice traffic are required by Telcordia regulation to have less than 125 us throughput delay (based on the period of the Nyquist frequency). Therefore, from a network element perspective, it is advantageous to traverse a timeslot interchange stage with less throughput delay IF the particular interchanging requirements will allow for such.

It should be noted that the delays given above denote the delay of a given bit location (possibly the first bit or the framing bit) within the data frame while traversing a timeslot interchange function. This does not account for the change in time-position of a given data byte if that byte is switched to a different location in the data frame via the timeslot interchange function. For example, if a given data byte enters the timeslot interchange at time 0, byte 0, the data might be switched to byte (x−1), leaving the timeslot interchange stage at time z, where:

z=throughput delay (given previously)+time-position change z=throughput delay+((x−1) bytes*byte delay).

Notice that the byte delay is additive to the throughput delay, since the byte is now located (x−1) bytes later in the data frame.

The example could be reversed such that a given data byte enters the timeslot interchange at time 0, byte (x−1), and is to be switched to byte 0, leaving the timeslot interchange stage at time a, where:

a=throughput delay (given previously)+time position change a=throughput delay+(−(x−1) bytes*byte delay)

a=throughput delay−((x−1) bytes*byte delay)

Notice that in this case, the byte delay is subtracted from the throughput delay, since the byte is now located (x−1) bytes earlier in the data frame.

In summary, the timeslot interchange function produces a set throughput delay to the data frame which is always constant, and is equal to the time of one row of the data frame, but that any particular byte traversing a timeslot interchange may be subject to more or less than this delay, based on the time-position of the byte leaving the timeslot interchange stage, relative to the time-position of the byte as it enters the stage.

Figure 6:
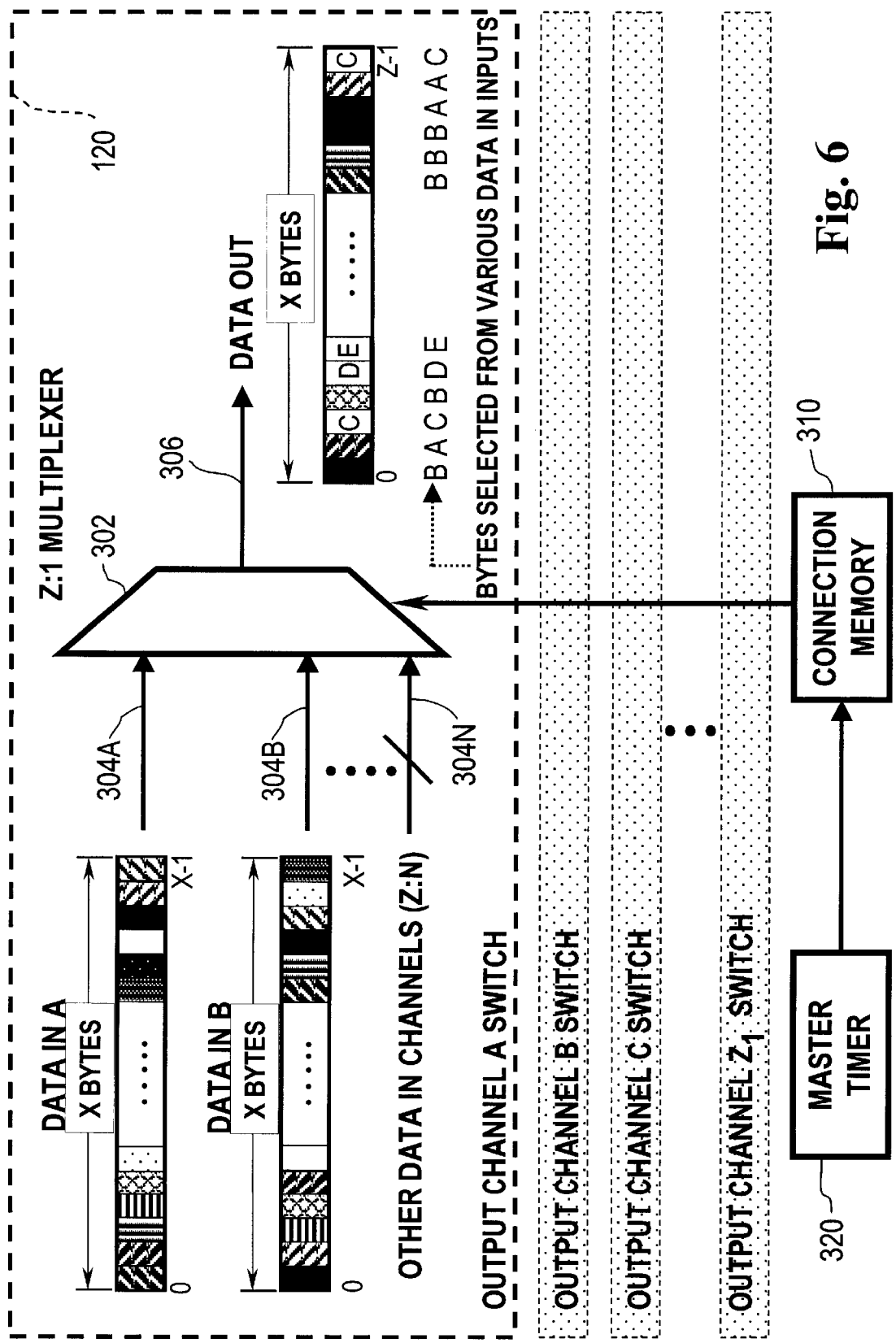
FIG. 6 is a block and functional diagram illustrating a preferred form of the space switch shown in FIG. 4.

Space switch function 120 is shown in FIG. 6. There are three primary elements involved in space-switch function 120:

(1) Some number $Z_1$ of Z:1 multiplexers, such as multiplexer 302, which receive data from multiple inputs, such as 304A–304N;

(2) A connection memory 310; and (3) A master timer 320.

The number $Z_1$ may or may not be equal to Z, depending on the type of space-switch. In the case of a square space-switch with N inputs and outputs (a square multiplexer), $Z_1$=Z. In the case of a space-switch with more outputs than inputs (a space-expanding multiplexer), $Z_1$>Z. In the case of a space-switch with less outputs than inputs (a space-compressing multiplexer), $Z_1$<Z. A given 3-stage space switch may provide additional channels for routability by having a space-expanding multiplexer at its entry node, a square multiplexer at is center node, and a compressing multiplexer at its exit node.

Every Z:1 multiplexer 302 takes in Z inputs, and produces one output on a bus, such as bus 306. The selection of Z inputs is controlled by connection memory 310. Once each byte time, the Z:1 multiplexer is updated by connection memory 310 to select one of the data on inputs 304A–304N to transmit for that byte time. Hitless switching between bytes from different inputs is guaranteed, because the switching always occurs on byte boundaries.

Connection memory 310 stores x connection memory addresses, one address for each byte of one row of the data out output frame. Each connection memory address stores the number of the data input to be sent at a given data out byte time. For example, if the connection memory address for byte (x−1) is equal to data in N, this indicates that the data entering the Z:1 multiplexer 302 during the (x−1) byte time will be sent during byte time (x−1) of data out.

Master timer 320 controls the timing of connection memory 310 such that the connection memory only updates Z:1 multiplexer 302 on byte boundaries.

The delay encountered in traversing a space-switch function is insignificant, mainly due to the fact that no data buffering occurs. In general, the space-switch acts like a large-scale multiplexer with a sizable number of inputs and outputs, and similar to a multiplexer, the space-switch has very little throughput delay associated with it. The delay is so small, in fact, that in comparison to a byte time, it can be considered negligible.

Figure 1:
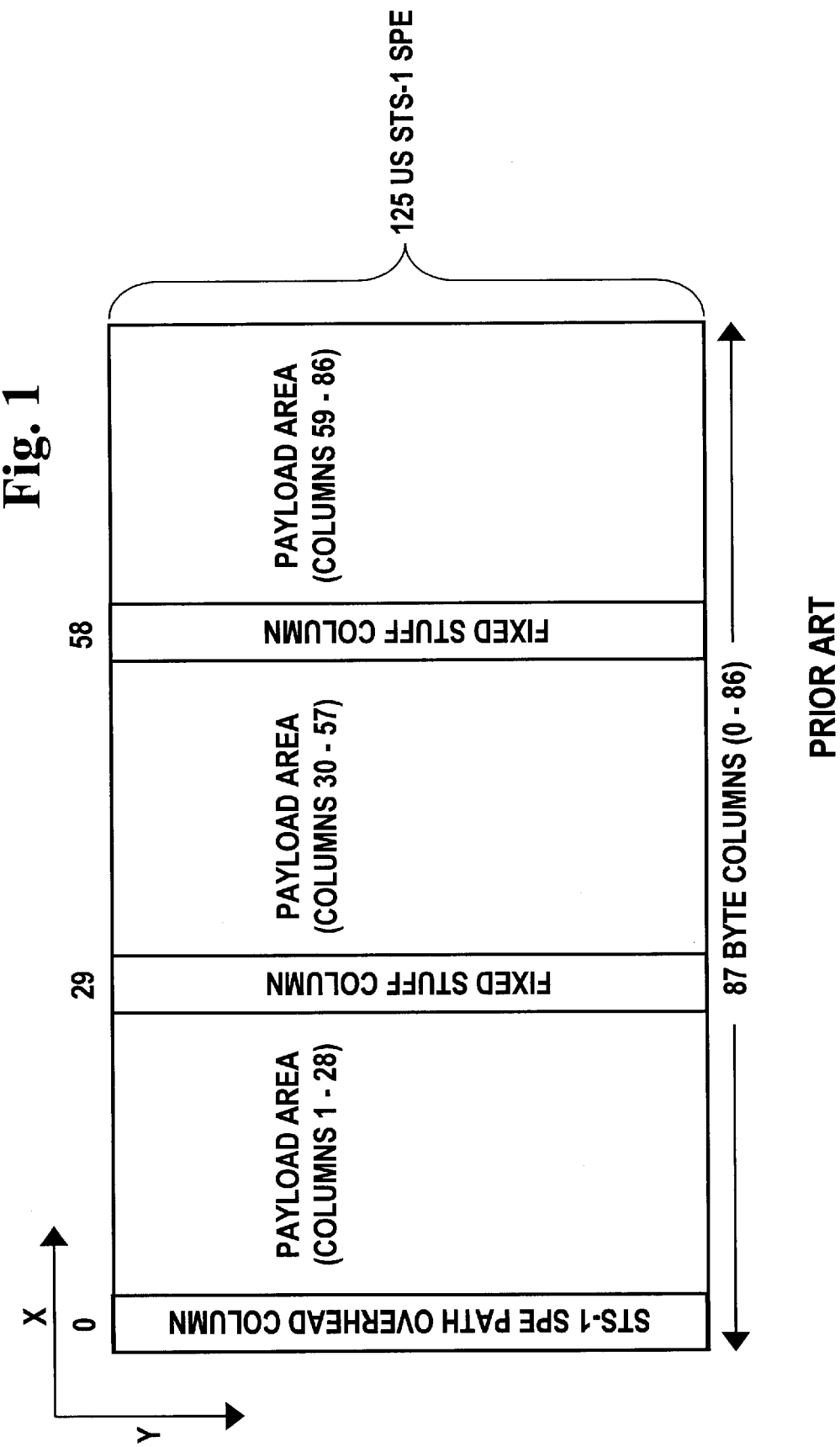
FIG. 1 is a graph illustrating a conventional STS-1 Synchronous Payload Envelope (SPE).
Figure 7:
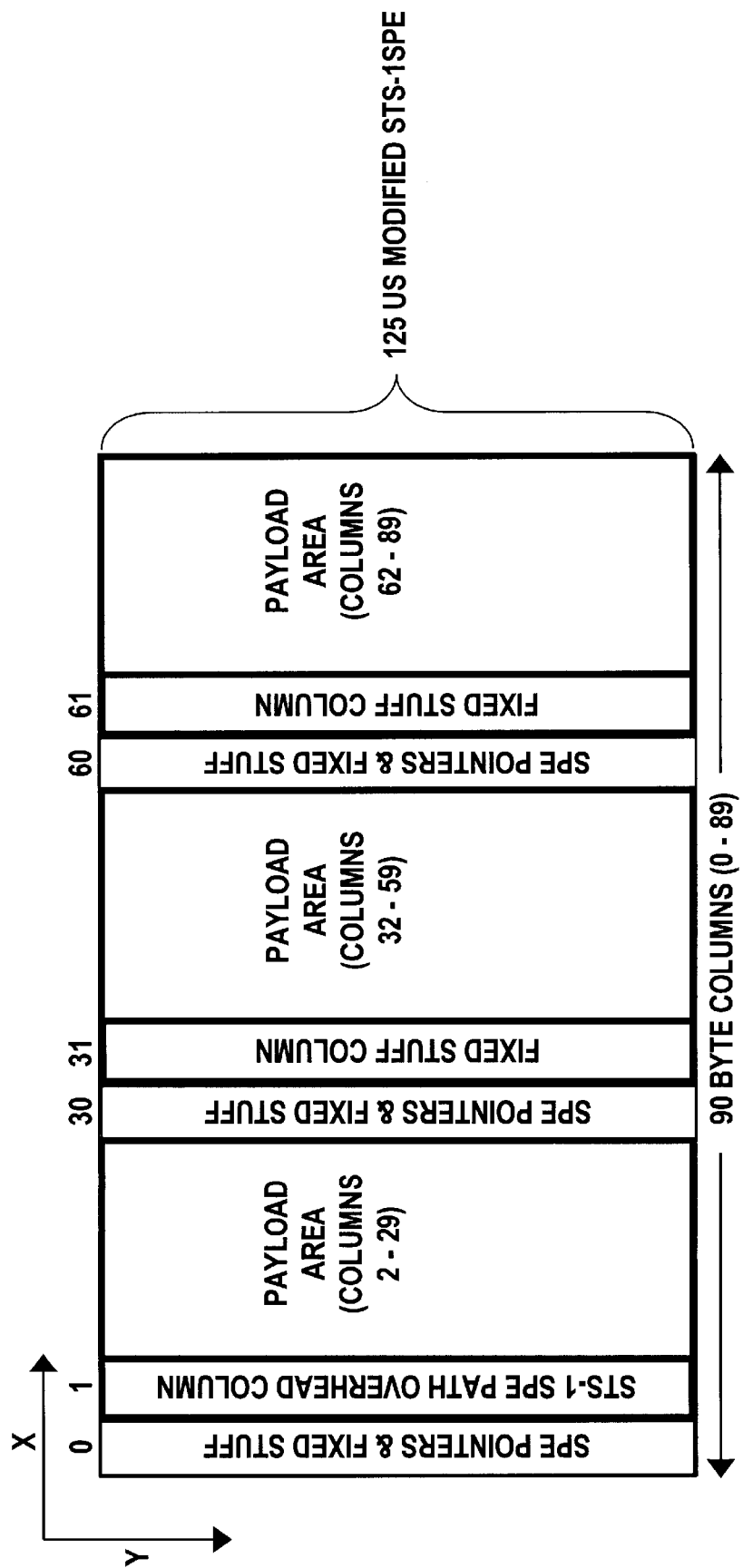
FIG. 7 is a graph illustrating a preferred form of a modified STS-1 SPE with SPE pointer for the present invention.

The preferred form of a modified STS-1 SPE (Synchronous Payload Envelope) with SPE pointer according to the invention is shown in FIG. 7 which demonstrates the addition of three columns to the existing SPE, shown in FIG. 1, along with the addition of a ninth bit to every 8-bit byte to form the modified STS-1 SPE with SPE pointer. The three additional columns are used to carry the SPE pointer from the transport overhead, along with fixed stuff bits. The ninth bit is added after the existing least significant bit of each byte of the SPE. The ninth bit becomes the least significant bit of each byte of the SPE.

Figure 2:
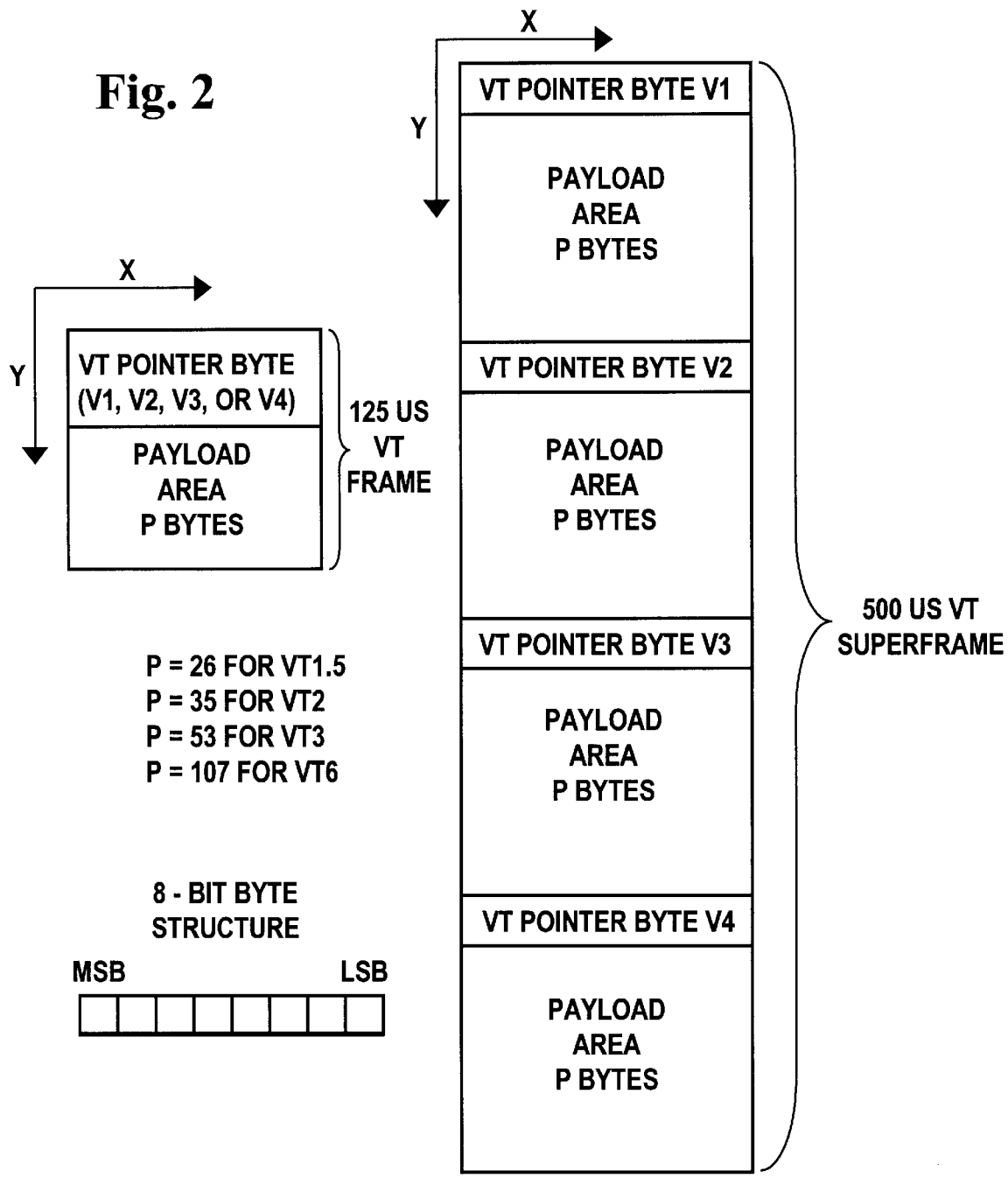
FIG. 2 is a graph illustrating conventional VT frames and superframes.
Figure 8:
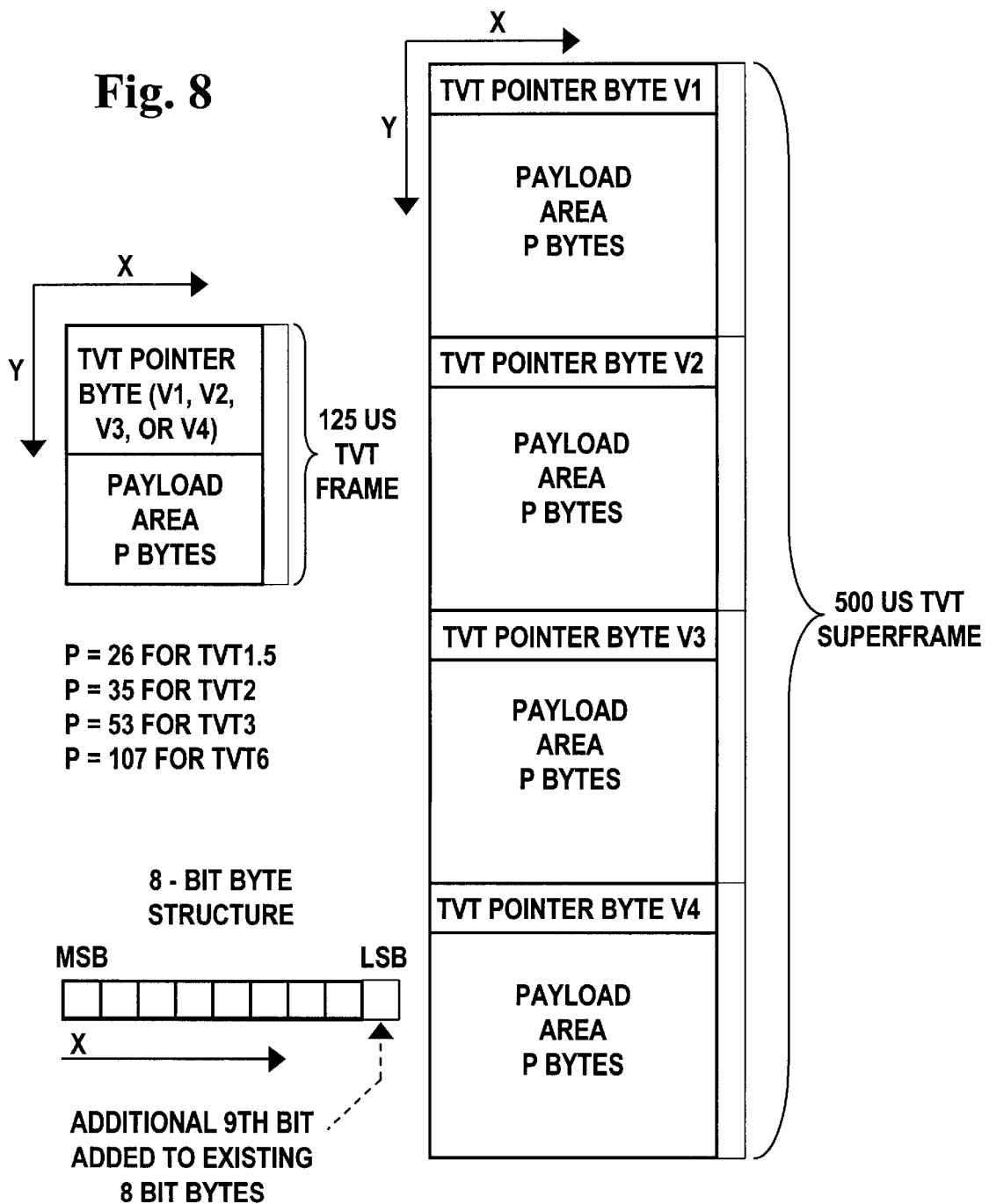
FIG. 8 is a graph illustrating a preferred form of mapping for VT to internal TVT data collections.

The VT to Internal TVT Mapping is shown in FIG. 8 which demonstrates the addition of a ninth bit to every 8-bit byte specified for each VT size given in FIG. 2 to form an Internal TVT signal, whose number of bytes is equal to the number of bytes of the corresponding VT before the addition of the ninth bit. The ninth bit is added after the existing least significant bit of each byte of a given VT. The ninth bit becomes the least significant bit of each byte of a given TVT.

Figure 9:
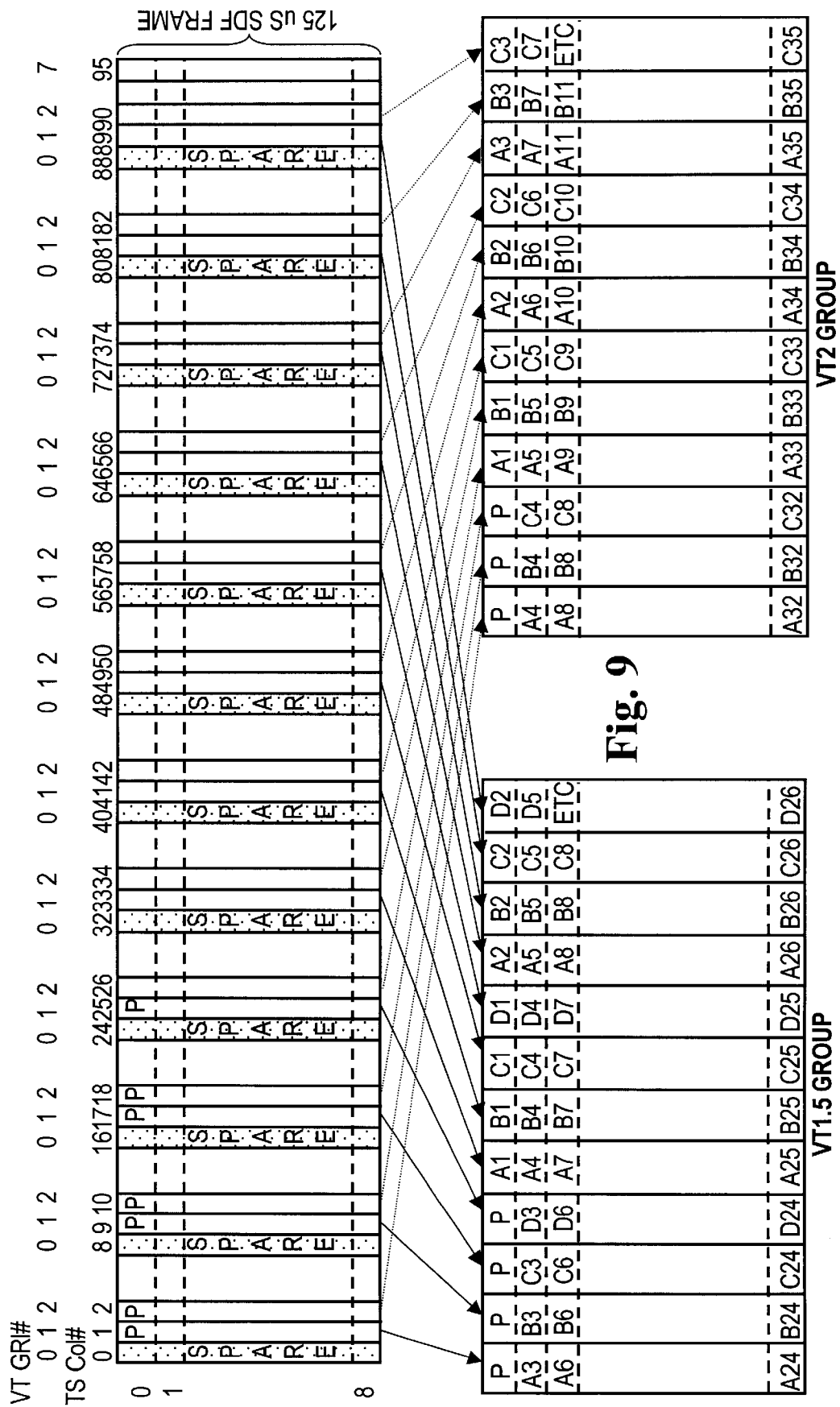
FIG. 9 is a diagram illustrating the mapping of VT 1.5 and VT 2 groups into a preferred frame format for the present invention.

A mixed 864 byte TVT SDF Frame format (96 Columns by 9 Rows) is shown in FIG. 9 which demonstrates the optimum SDF frame format when mixed TVT level signals are mapped into the same SDF. In addition to the 84 byte-columns required by the SONET standards for simultaneous transport of 7 VT groups of information, 12 additional columns (1 TVT group worth of bandwidth) are added in a byte-interleaved fashion that can be used for a variety of functions.

The 8 TVT groups (7 plus the spare TVT group) and their corresponding TVT signals are byte interleave mapped into the SDF starting with the spare timeslot, and continuing through the 7 TVT payload group bytes, as shown in FIG. 9. This process continues until one byte of each TVT has been transmitted. As soon as one byte of each TVT has been transmitted, the transmission of the second data byte of each TVT signal begins, and the process repeats until an SDF frame of data has been transmitted. Due to the 96 column by 9 row format of the SDF frame, each timeslot column carries ~0.5 Mbps of data bandwidth, and therefore, each TVT payload type will require a plurality of timeslot columns, depending on the size of the payload to be transmitted.

TVT 1.5 payloads have 27 TVT bytes per SDF frame, and therefore require 3 timeslot columns. Due to the mapping given above, the three timeslot columns are byte interleaved with all the other TVT signals, and thus are not located next to each other. The three columns are spaced by 32 timeslots, taking into account both the TVT payload and spare columns (i.e., a single TVT1.5 payload will occupy column 1, 33, and 65 of the SDF).

TVT2 payloads have 36 TVT bytes per SDF frame, and therefore require 4 timeslot columns. The four columns are spaced by 24 timeslots (i.e., a single TVT2 payload occupies columns 1, 25, 49, and 73 of the SDF).

TVT3 payloads have 54 bytes per SDF frame, and therefore require 6 timeslot columns. The six columns will be spaced by 16 timeslots (i.e. a single TVT3 payload will occupy column 1, 17, 33, 49, 65, and 81).

TVT6 payloads have 108 TVT bytes per SDF frame, and therefore require 12 timeslot columns. Note that 12 timeslot columns are used to carry an entire TVT group of data, and therefore, one entire TVT group is taken up by a TVT6 signal. The twelve columns are spaced on TVT group boundaries, and therefore are separated by 8 timeslots (i.e., a single TVT6 payload occupies columns 1, 9, 17, 25, 33, 41, 49, 57, 65, 73, 81, and 89).

The TVT pointer is located in the first byte of each TVT signal. In FIG. 9, a pointer is indicated by "P."

Referring to FIG. 9, byte 0 of the first TVT0.5 in each TVT1.5 and TVT2 is the pointer byte and contains V1, V2, V3 or V4. A, B, C, and D are the four TVT1.5s that make up the VT1.5 group. A, B, C are the three TVT2s that make up the VT2 group.

Figure 10A:
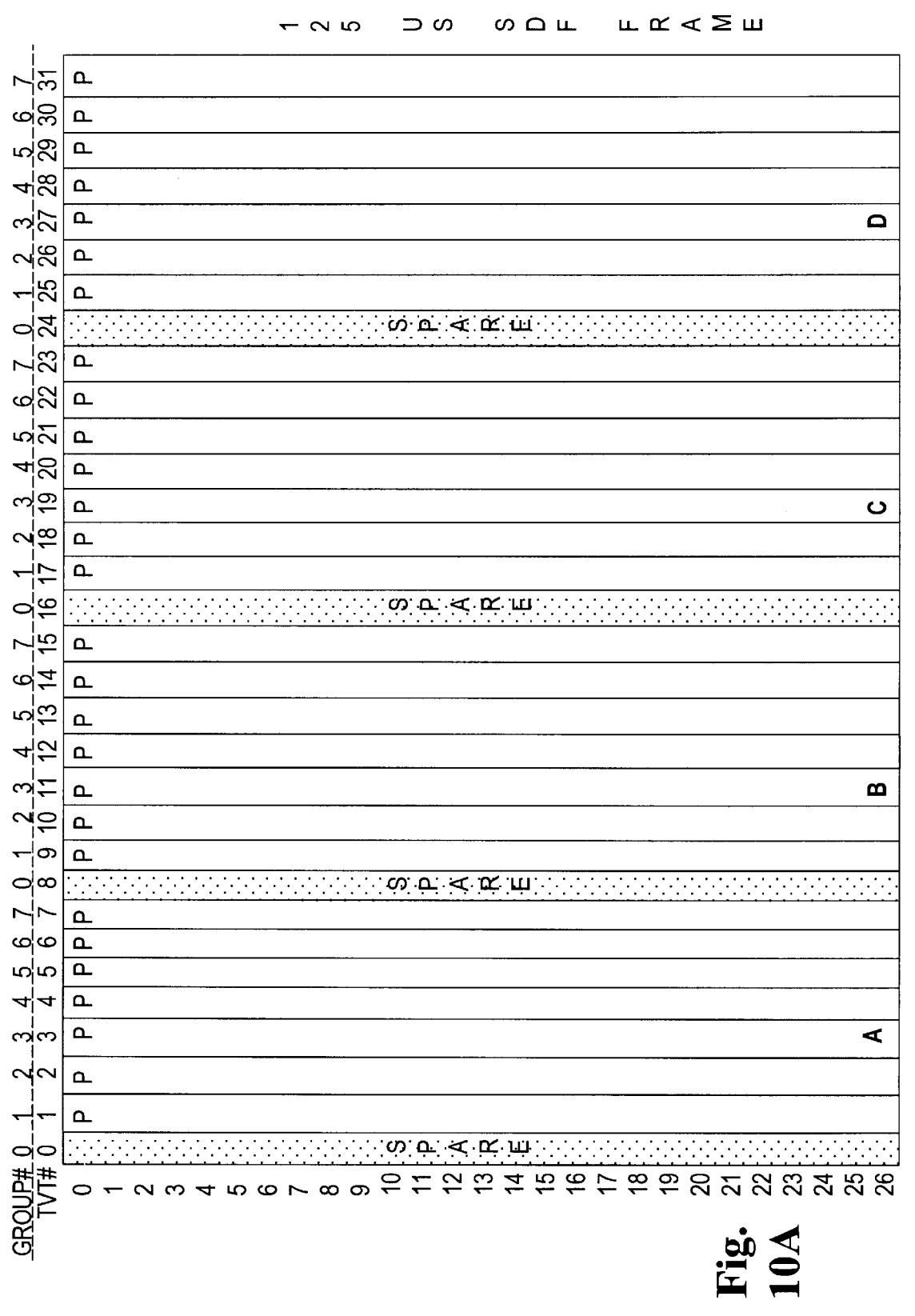
Figure 10B:
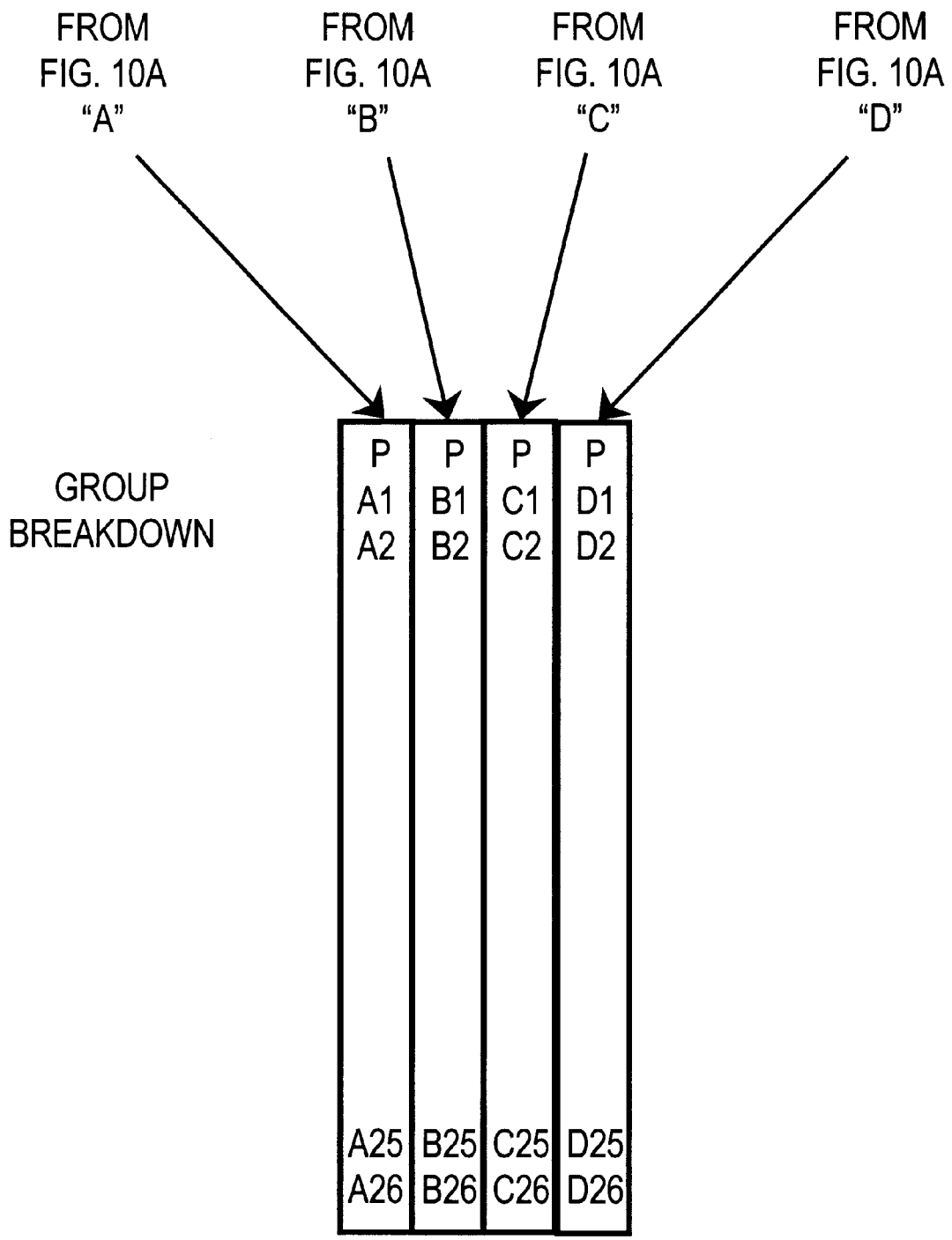

The TVT 1.5 SDF Frame Structure (32 columns by 27 rows) is known to exist, and is shown in FIGS. 10A and 10B. These figures demonstrate the optimum 864 byte SDF frame structure when only TVT1.5 level signals, shown in FIG. 8, are mapped into the SDF. In this case, the ~0.5 Mbps timeslot column resolution, shown in FIG. 9, is not needed at the time switch (due to the fact that TVT2 signals will not be time-switched within the same SDF), and therefore, the view of the SDF frame can be altered to triple the number of rows, while reducing the number of columns in the frame by 3. This format only alters the column and row format of the SDF, and does not affect the overall number of TVT bytes in an SDF frame.

Restructuring the SDF frame to optimize for TVT1.5 signals allows a single SDF timeslot column to carry an entire TVT1.5 worth of data. Putting the entire TVT1.5 in a single timeslot column reduces the throughput delay substantially, as only 32 SDF bytes of data need to be buffered at each timeslot interchange stage, as compared to 96 SDF bytes for the structure given in FIG. 9.

Each TVT byte is placed into the SDF frame in the same manner given for FIG. 9, with the assertion that once each 32 timeslot row has been filled, the next byte is entered at the next row. The frame format shown in FIGS. 10A and 10B reduces time switching delay by a factor of three compared with the structure of FIG. 9.

Referring to FIGS. 10A and 10B, byte 0 of each TVT 1.5 is the pointer byte and contains V1, V2, V3, or V4. A, B, C, and D are the four TVT1.5s that make up this group. In FIGS. 10A and 10B, a pointer is indicated by "P."

Figure 11:
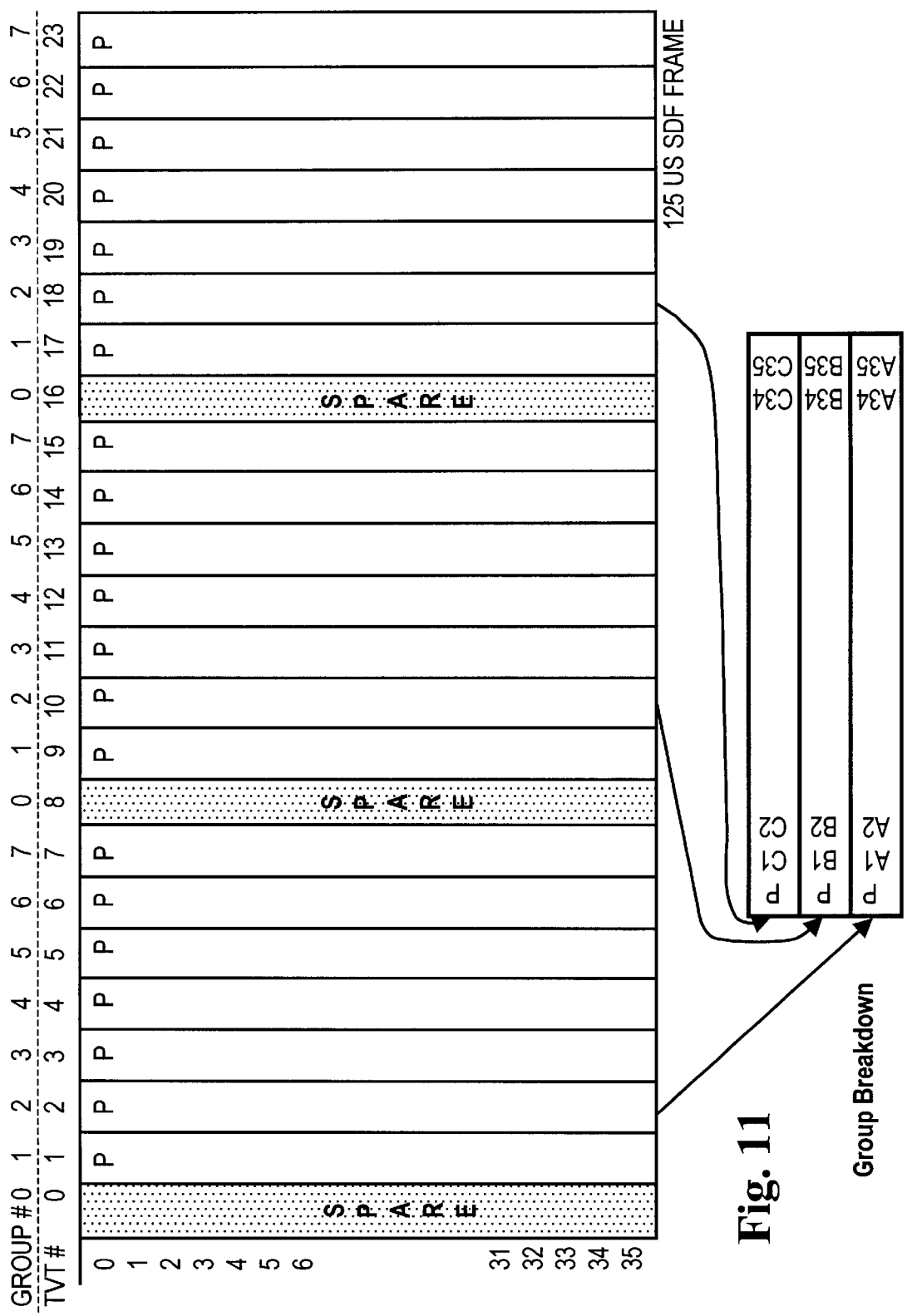
FIG. 11 is a graph illustrating a frame format utilizing 24 columns and 36 rows that is useful with an embodiment of the invention.

The TVT2 SDF Frame Structure (24 Columns by 36 Rows) is known to exist, and is shown in FIG. 11. This figure demonstrates the optimum 864 byte SDF frame structure when only TVT2 level signals, shown in FIG. 8, are mapped into the SDF. Note that in this case, the ~0.5 Mbps timeslot column resolution, shown in FIG. 9, is not needed at the time switch (due to the fact that TVT1.5 signals will not be time-switched within the same SDF), and therefore, the view of the SDF frame can be altered to quadruple the number of rows, while reducing the number of columns in the frame by 4. Note that doing this only alters the column and row format of the SDF, and does not affect the overall number of TVT bytes in an SDF frame.

Restructuring the SDF frame to optimize for TVT2 signals allows a single SDF timeslot column to carry an entire TVT2 worth of data. Putting the entire TVT2 in a single timeslot column reduces the throughput delay substantially, as only 24 SDF timeslot columns of data need to be buffered at each timeslot interchange stage, as compared to 96 SDF timeslot columns for the structure given in FIG. 9.

Each TVT byte is placed into the SDF frame in the same manner given for FIG. 9, with the assertion that once each 24 timeslot row has been filled, the next byte is entered at the next row. The frame format shown in FIG. 11 reduces time switching delay by a factor of four compared with the structure of FIG. 9.

Referring to FIG. 11, byte 0 of each TVT2 is the pointer byte and contains V1, V2, V3, or V4. A, B, C, are the three TVT2s that make up this group. In FIG. F11, a pointer is indicated by "P."

Figure 12:
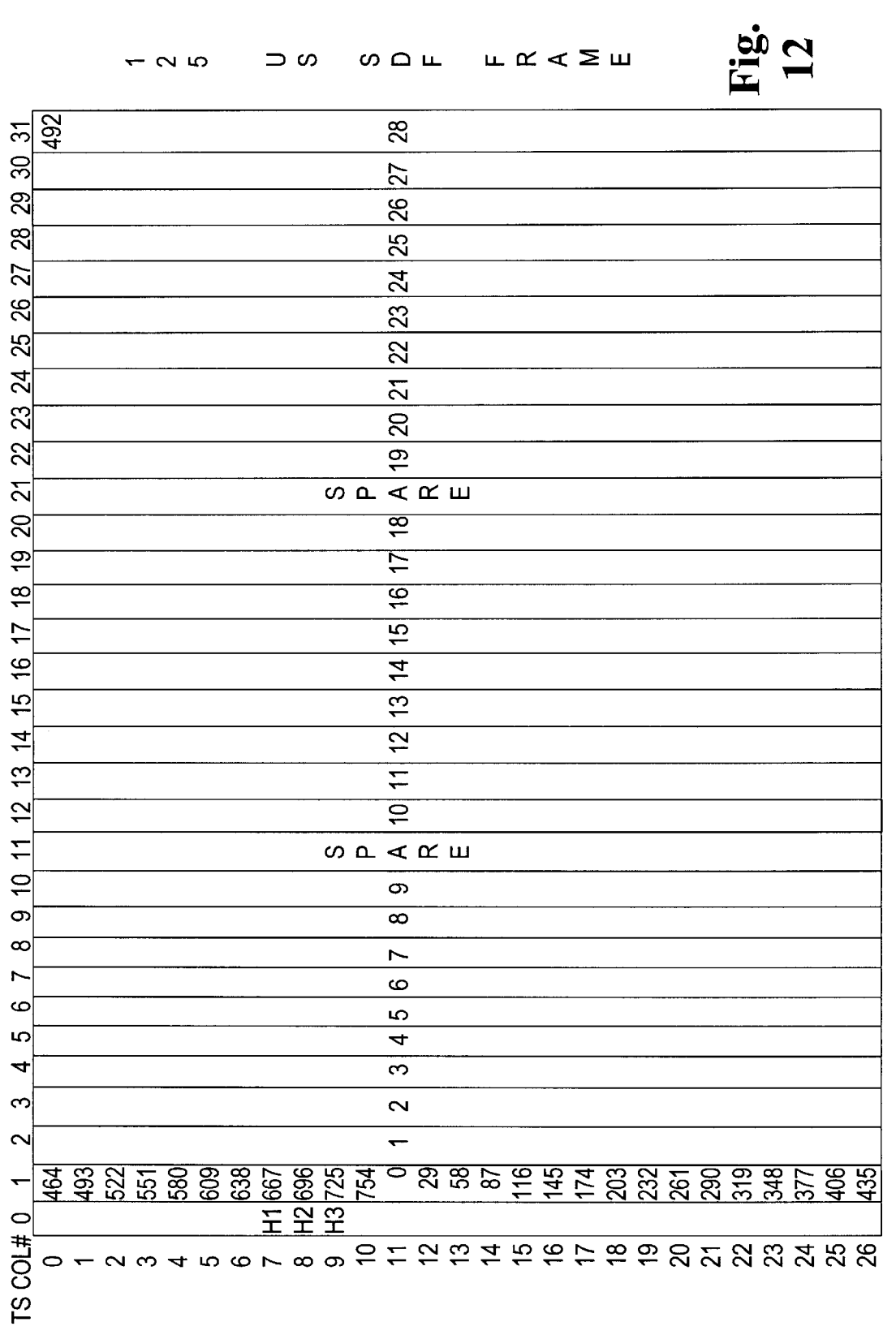

The modified STS-1 SPE SDF Frame Structure (32 Columns by 27 Rows) is known to exist, and is shown in FIG. 12. This figure demonstrates the 864 byte optimum SDF frame structure when a Modified SPE intact payload, shown in FIG. 7, is mapped into the SDF. In addition to the 90 byte-columns required for transport of the SPE payload, path overhead (POH), pointer bytes, and fixed stuff bytes, 6 additional columns are added in a byte-interleaved fashion that can be used for a variety of functions.

As in the case of the TVT1.5 mapped SDF, shown in FIGS. 10A and 10B, the ~0.5 Mbps timeslot column resolution, shown in FIG. 9, is not needed at the time switch (due to the fact that TVT level signals will not be time-switched within the same SDF), and therefore, the view of the SDF frame can be altered to triple the number of rows, while reducing the number of columns in the frame by 3. Note that doing this only alters the column and row format of the SDF, and does not affect the overall number of TVT bytes in an SDF frame.

In the SPE intact case, the SDF frame structure could have been chosen as having 96 columns, 32 columns, 24 columns, or some other derivative. However, based on the structure of the modified STS-1 SPE given in FIG. 7, and taking into account the 6 spare timeslots, it is logical to view the SDF as having 32 timeslots columns of 27 bytes each. This structure maps the SPE pointers and fixed stuff in the same timeslot column, maps the payload area (and POH and fixed stuff columns) into 29 timeslot columns, and allows for 2 spare timeslots for rearrangement purposes.

Restructuring the SDF frame to optimize for SPE signals reduces the throughput delay substantially, as only 32 SDF timeslot columns of data need to be buffered at each timeslot interchange stage, as compared to 96 SDF timeslot columns for the structure given in FIG. 9.

Each TVT byte is placed into the SDF frame in the same manner given for FIG. 9, with the assertion that once each 32 timeslot row has been filled, the next byte is entered at the next row.

The frame and payload mapping formats shown in FIGS. 7–12 also can be used for data processed according to the SDH standard:

(1) In the case of DS1, the DS1 is directly mapped into a C-11. Then the VC path overhead is added to form a VC-11. TU pointers are added to form a TU-11 tributary unit which has the same exact bandwidth as a VT1.5 (1.728 Mbps).

(2) In the case of E1, the E1 is directly mapped into a C-12. Then the VC path overhead is added to form a VC-12. TU pointers are added to form a TU-12 tributary unit which has the same exact bandwidth as a VT2 (2.304 Mbps).

(3) In the case of a DS2, the DS2 is directly mapped into a C-2. Then the VC path overhead is added to form a VC-2. TU pointers are added to form a TU-2 tributary unit which has the same exact bandwidth as a VT6 (6.912 Mbps).

The TU-11, TU-12 and TU-2 are mapped into the TVT1.5, TVT2 and TVT6, respectively, which then are processed in the manner previously described.

The foregoing embodiments offer several features:

(1) A SONET-based format, compatible with GR-253-CORE standards for payload mappings, overhead functions, and pointer functions;

(2) A single format that supports mixed VT1.5, VT2, VT3 and VT6 mappings;

(3) A format that allows independent cross-connection of VT1.5, VT2, VT3, and VT6 mappings;

(4) A format that supports and allows cross-connection of STS-1 SPE mappings, including the SPE pointer and POH as part of the payload;

(5) A format that could be concatenated to support and allow cross-connection of STS-nc SPE mappings, including the SPE pointer and POH as part of the payload;

(6) A format that provides overhead on a per byte basis for various shared functions;

(7) A format with a frame period of 125 us;

(8) A format with a superframe period of 500 us (for VT superframe indications);

(9) A format with a speedup factor (including overhead and additional routing channels) no greater than 20% of the frequency of an STS-1 signal, and possessing maximum bandwidth efficiency;

(10) A format with a bit rate equal to a common multiple or common divisor of a standard telecom frequency signal (to allow standard, off-the shelf clock recovery devices to be used);

(11) A format that can be optimized to support multi-rate timeslot interchange capability, to reduce the throughput delay for elements not requiring the full granularity of all levels of VT cross-connection; and

(12) A format that provides at least one additional timeslot column to that required by the SONET standard for various system functions.

The mixed TVT SDF Frame format (96 Columns by 9 Rows) shown in FIG. 9 meets all the features given above.

(a) The SDF has a bit rate equal to 62.208 Mbps, which is exactly 1.2 times the frequency of the STS-1 signal. This meets the feature given in (9). Also, the SDF frequency is exactly 1/10 the frequency of an STS-12 signal, meeting the feature given in (10).

(b) The SDF has a total of 96 columns. This is derived from the following:

84 columns are needed to support 7 VT Groups as defined for SONET (12 columns per VT group).

Columns,≧84 for SONET VT support 87 columns are needed to support the SONET STS-1 SPE, as shown in FIG. 1. To include the SPE Pointers, it is necessary to add at least 1 more column, bringing the minimum number of columns required to 88. Note that for this calculation, it has been assumed that the SPE pointers are located within the same SDF column. The actual SDF implementation does not reflect this approach, rather it spreads the SPE pointers across three separate columns, as shown in FIG. 7. For calculation sake, though, the minimum viable number of columns required is 88.

Columns≦88 for SONET SPE support

To support multi-rate timeslot interchange switching, the number of columns in the structure should be divisible by 3 (to support VT 1.5 granularity switching) and 4 (to support VT2 granularity switching), or equivalently, should have a least common multiple of 12.

Columns/12=integer

In order to meet features described above, a preferred number of columns required in the SDF frame structure is 96. The 96 Column by 9 Row format meets at least the features given in (1), (2), (3), (4), (5), (11) and (12) above.

(c) The SDF has an extra ninth bit added to each data byte for various overhead functions. Taken together with the information given in (a) and (b) above:

SDF Frame Period=(96 Byte Columns/Row)*(9 Rows/Frame)*(9 Bits/Byte)*(1/62.208 Mbps)

This meets features given in (6) and (7) and (8) above.

In some cases, the full feature set demanded of the mixed TVT SDF Frame Structure (96 Columns by 9 Rows) is not required, and may in fact be undesirable due to the large throughput delay incurred in 96 timeslot buffering through each timeslot interchange stage. In these cases, other frame structures satisfy the particular payload requirements, while greatly reducing the timeslot interchange delay incurred.

The TVT1.5 SDF Frame Structure (32 Columns by 27 Rows) (Figures 10A and 10B) meets all features identified in (1) through (12) above, except for VT2 cross-connection, and has the benefit of requiring only 32 timeslots of buffer delay in each timeslot interchange stage, reducing the throughput delay vs. the 96 column approach by a factor of three.

The TVT2 SDF Frame Structure (24 Columns by 36 Rows) (FIG. 11) meets all features identified in (1) through (12) above, except for VT1.5 or VT3 cross-connection, and has the benefit of requiring only 24 timeslots of buffer delay in each timeslot interchange stage, reducing the throughout delay vs. the 96 column approach by a factor of four.

The modified STS-1 SPE SDF Frame Structure (32 Columns by 27 Rows) (FIG. 12) meets all features identified in (1) through (12) above, except for VT mappings and cross-connection, and has the benefit of requiring only 32 timeslots of buffer delay in each timeslot interchange stage, reducing the throughput delay vs. the 96 column approach by a factor of 3. Another embodiment of the invention uses a 792 byte frame format structured with 88 columns and 9 rows. This approach attempts to reduce the number of columns required, while still supporting all the VT and STS-n SPE mappings, at the expense of multi-rate timeslot interchange not being supported. Such a format would have a bit rate of 57.024 Mbps and would meet only features (1) through (10) identified previously.

Those skilled in the art will recognize that the preferred embodiments may be altered and modified without departing from the true spirit and scope of the invention as defined in the accompanying claims. For example, the functions illustrated in FIGS. 3–6 may be implemented with a digital signal processor or other type of processor.

What is claimed is:

1. A switch system comprising:
   an input interface connected to convert a predetermined data frame structure carrying a plurality of data collections comprising different numbers of collection bytes into a predetermined frame format comprising a number of frame format bytes arranged in a number of rows and a number of columns carrying at least the data collections, the number of rows and the number of columns being varied, the number of rows being a multiple of a number evenly divisible into the different numbers of collection bytes;
   a time-space switch arranged for switching at least the data collections while storing a predetermined number of bytes less than the number of frame format bytes at any one time to generate switched data; and
   an output interface connected to convert the switched data to the predetermined data frame structure.

2. A switch system, as claimed in claim 1, wherein said time-space switch comprises a plurality of time switch stages, wherein said predetermined number of bytes is stored in at least one of said time switch stages and wherein said predetermined number of bytes in said one time switch stage is less than the number of bytes in two of said rows.

3. A switch system, as claimed in claim 1, wherein said data frame structure comprises a SONET STS-1 frame and wherein said data collections comprise a VT 1.5 group and a VT 2 group.

4. A switch system, as claimed in claim 3, wherein said data collections further comprise a VT 3 group and a VT 6 group.

5. A switch system, as claimed in claim 1, wherein said data frame structure comprises an SDH frame and where said data collections comprise a TU-11 tributary unit group and a TU-12 tributary unit group.

6. A switch system, as claimed in claim 5, wherein said data collections further comprise a TU-2 tributary unit group.

7. A switch system, as claimed in claim 1, wherein said data collections are converted into different integer numbers of said predetermined columns.

8. A switch system, as claimed in claim 7, wherein said switch comprises:
   a time switch interchanging columns of said frame format; and
   a space switch switching columns of said frame format.

9. A switch system, as claimed in claim 8, wherein said time switch comprises a data memory storing one of said rows of data and a connection memory storing data corresponding to said columns of data, said time switch interchanging bytes of data between said columns of said one row of data after the one row of data is stored in said data memory.

10. A switch system, as claimed in claim 7, wherein said different integer numbers include the number 4 and the number 3.

11. A switch system, as claimed in claim 1, wherein said number of frame format bytes comprises at least 792 bytes.

12. A switch system, as claimed in claim 11, wherein said predetermined number of rows is 9 and said predetermined number of columns is 88.

13. A switch system, as claimed in claim 1, wherein said number of frame format bytes comprises 864 bytes.

14. A switch system, as claimed in claim 13, wherein said predetermined number of rows is 9 and said predetermined number of columns is 96.

15. A switch system, as claimed in claim 13, wherein said switching of said time-space switch results in a delay and wherein said predetermined number of rows is 27 and said predetermined number of columns is 32, whereby said delay is reduced by a factor of three when the plurality of data collections comprises only VT 1.5 groups.

16. A switch system, as claimed in claim 13, wherein said switching of said time-space switch results in a delay and wherein said predetermined number of rows is 36 and said predetermined number of columns is 24 whereby said delay is reduced by a factor of four when the plurality of data collections comprises only VT 2 groups.

17. A switch system, as claimed in claim 1, wherein said plurality of data collections comprises a SONET STS-1 synchronous payload envelope.

18. A method of switching communication data comprising:
   converting a predetermined data frame structure carrying a plurality of data collections comprising different numbers of collection bytes into a predetermined frame format comprising a number of frame format bytes arranged in a number of rows and a number of columns carrying at least the data collections, the number of rows and the number of columns being varied, the number of rows being a multiple of a number evenly divisible into the different numbers of collection bytes;
   time-space switching at least the data collections while storing a predetermined number of bytes less than the number of frame format bytes at any one time to generate switched data; and
   converting the switched data to said predetermined data frame structure.

19. A method, as claimed in claim 18, wherein said time-space switching comprises time switching in a plurality of stages, wherein said predetermined number of bytes is stored during at least one of said time switching stages and wherein said predetermined number of bytes stored during said one time switching stage is less than the number of bytes in two of said rows.

20. A method, as claimed in claim 18, wherein said data frame structure comprises a SONET STS-1 frame and wherein said data collections comprise a VT 1.5 group and a VT 2 group.

21. A method, as claimed in claim 20, wherein said data collections further comprise a VT 3 group and a VT 6 group.

22. A method, as claimed in claim 18, wherein said data frame structure comprises an SDH frame and where said data collections comprise a TU-11 tributary unit group and a TU-12 tributary unit group.

23. A method, as claimed in claim 22, wherein said data collections further comprise a TU-2 tributary unit group.

24. A method, as claimed in claim 18, wherein said data collections are converted into different integer numbers of said predetermined columns.

25. A method, as claimed in claim 24, wherein said switching comprises:
   time interchanging columns of said frame format; and
   space switching columns of said frame format.

26. A method, as claimed in claim 25, and further comprising storing one of said rows of data and storing connection information corresponding to said columns of data, said time switching comprising interchanging bytes of data between said stored columns of said one row of data after the one row of data is stored.

27. A method, as claimed in claim 24, wherein said different integer numbers include the number 4 and the number 3.

28. A method, as claimed in claim 18, wherein said number of frame format bytes comprises at least 792 bytes.

29. A method, as claimed in claim 28, wherein said predetermined number of rows is 9 and said predetermined number of columns is 88.

30. A method, as claimed in claim 18, wherein said number of frame format bytes comprises 864 bytes.

31. A method, as claimed in claim 30, wherein said predetermined number of rows is 9 and said predetermined number of columns is 96.

32. A method, as claimed in claim 30, wherein said switching results in a delay and wherein said predetermined number of rows is 27 and said predetermined number of columns is 32, whereby said delay is reduced by a factor of three when the plurality of data collections comprises only VT 1.5 groups.

33. A method, as claimed in claim 30, wherein said switching results in a delay and wherein said predetermined number of rows is 36 and said predetermined number of columns is 24 whereby said delay is reduced by a factor of four when the plurality of data collections comprises only VT 2 groups.

34. A method, as claimed in claim 18, wherein said plurality of data collections comprises a SONET STS-1 synchronous payload envelope.

* * * * *